United States Patent [19]
Toda

[11] Patent Number: 5,723,934
[45] Date of Patent: Mar. 3, 1998

[54] SURFACE ACOUSTIC WAVE POSITION-SENSING DEVICE

[76] Inventor: Kohji Toda, 1-49-18 Futaba, Yokosuka 239, Japan

[21] Appl. No.: 694,981

[22] Filed: Aug. 9, 1996

[51] Int. Cl.$^6$ ........................................... H01L 41/08
[52] U.S. Cl. ................................ 310/313 R; 310/313 A; 310/313 D; 178/18
[58] Field of Search ..................... 310/313 R, 313 A, 310/313 B, 313 D; 333/150–155, 193–196; 178/18, 19

[56] References Cited

U.S. PATENT DOCUMENTS

| | | | |
|---|---|---|---|
| 3,568,102 | 3/1971 | Tseng | 310/313 D X |
| 4,791,416 | 12/1988 | Adler | 310/313 D X |
| 5,160,869 | 11/1992 | Nakahata et al. | 310/313 A |
| 5,329,208 | 7/1994 | Imai et al. | 310/313 R |
| 5,543,591 | 8/1996 | Gillespie et al. | 178/18 |
| 5,591,945 | 1/1997 | Kent | 178/19 |

Primary Examiner—Mark O. Budd

[57] ABSTRACT

A surface acoustic wave position-sensing device comprising a piezoelectric substrate, a nonpiezoelectric plate, at least two surface acoustic wave transducing units X and Y having N propagation lanes $U_{Xi}$ (i=1, 2, ......, N) and $U_{Yi}$ (i=1, 2, ......, N), respectively, and a controlling system connected with the units X and Y. Each unit includes input and output interdigital transducers formed on the upper end surface of the piezoelectric substrate. One end surface of the nonpiezoelectric plate is mounted on the upper end surface of the piezoelectric substrate through the interdigital transducers. When an electric signal $E_T$ is applied to the input interdigital transducer, a surface acoustic wave is excited on an area, in contact with the input interdigital transducer, of the upper end surface of the piezoelectric substrate. The surface acoustic wave is transmitted to an area, in contact with the output interdigital transducer, of the upper end surface of the piezoelectric substrate, through the nonpiezoelectric plate, and is transduced to an electric signal $E_R$. If touching a crossing point of the lanes $U_{Xi}$ and $U_{Yi}$ n the upper end surface of the nonpiezoelectric plate, the surface acoustic wave is intercepted at the crossing point. Therefore, the magnitude of the electric signal $E_R$ corresponding to the crossing point decrease or disappearance. Thus, it is possible to specify the crossing point.

8 Claims, 13 Drawing Sheets

SURFACE ACOUSTIC WAVE POSITION-SENSING DEVICE

BACKGROUND OF THE INVENTION

1. Field of the Invention

The present invention relates to a surface acoustic wave device for sensing a touch-position on a nonpiezoelectric plate having at least two surface acoustic wave transducing units.

2. Description of the Prior Art

A resistance-film form of conventional touch panels has an electrically conductive transparent film, the magnitude of the resistance thereof changing when touching thereon. The resistance-film form of conventional touch panels is operated under low power consumption, however has some problems on response time, sensitivity, durability and others. An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destruction evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production.

Thus, there are some problems on response time, sensitivity, durability, manufacturing, mass production, difficulty in use, operation frequencies, and high voltage operation with high power consumption in conventional touch panels.

SUMMARY OF THE INVENTION

An object of the present invention is to provide a surface acoustic wave position-sensing device capable of specifying a touch-position on the nonpiezoelectric plate with a finger or others with a high sensitivity and a quick response time.

Another object of the present invention is to provide a surface acoustic wave position-sensing device excellent in durability, manufacturing, mass-production.

Another object of the present invention is to provide a surface acoustic wave position-sensing device being easy to support the piezoelectric plate or the nonpiezoelectric plate.

Another object of the present invention is to provide a surface acoustic wave position-sensing device being easy to use.

A still other object of the present invention is to provide a surface acoustic wave position-sensing device operating under low power consumption with low voltage.

A still further object of the present invention is to provide a surface acoustic wave position-sensing device with a small size which is very light in weight and has a simple structure.

According to one aspect of the present invention there is provided a surface acoustic wave position-sensing device comprising a piezoelectric substrate, a nonpiezoelectric plate, at least two surface acoustic wave transducing units X and Y, and a controlling system connected with the surface acoustic wave transducing units X and Y. Each surface acoustic wave transducing unit consists of N interdigital transducers $T_i$ (i=1, 2, ......, N) and an interdigital transducer R formed on an upper end surface of the piezoelectric substrate, and N switches $W_i$ (i=1, 2, ......, N), output terminals thereof being connected with input terminals of the interdigital transducers $T_i$, respectively. The thickness of the piezoelectric substrate is larger than approximately three times an interdigital periodicity p of the interdigital transducer $T_i$, the thickness d of the nonpiezoelectric plate is smaller than the interdigital periodicity p. The interdigital transducer R has an interdigital periodicity equal to the interdigital periodicity p. A lower end surface of the nonpiezoelectric plate is mounted on the upper end surface of the piezoelectric substrate through the interdigital transducers $T_i$ and R.

The interdigital transducer $T_i$ receives an electric signal $E_T$ with a frequency approximately corresponding to the interdigital periodicity p, and excites a surface acoustic wave of the zeroth mode and the higher order modes on an area, in contact with the interdigital transducer $T_i$, of the upper end surface of the piezoelectric substrate. The surface acoustic wave having the wavelength approximately equal to the interdigital periodicity p is transmitted to an area, in contact with the interdigital transducer R, of the upper end surface of the piezoelectric substrate, through the nonpiezoelectric plate. In this time, the phase velocity of the zeroth mode surface acoustic wave is approximately equal to the phase velocity of the Rayleigh wave traveling on the piezoelectric substrate alone under the electrically shorted condition, and the phase velocity of the higher order mode surface acoustic wave is approximately equal to the phase velocity of the Rayleigh wave traveling on the piezoelectric substrate alone under the electrically opened condition. The interdigital transducer R transduces the surface acoustic wave to an electric signal $E_R$ with a frequency approximately corresponding to the interdigital periodicity p.

The nonpiezoelectric plate is made of a material such that the phase velocity of the surface acoustic wave traveling on the nonpiezoelectric plate alone is lower than that traveling on the piezoelectric substrate alone.

The controlling system turns on and off the switches $W_i$ with a fixed period in turn, keeps a check on a magnitude of the electric signal $E_R$, senses a touch with a finger or others on an upper end surface of the nonpiezoelectric plate by a decrease or a disappearance in magnitude of the electric signal $E_R$, and picks out one of the switches $W_i$ turned on when the decrease or the disappearance in magnitude of the electric signal $E_R$ happens.

The surface acoustic wave transducing unit X has N propagation lanes $U_{Xi}$ (i=1, 2, ......, N) of the surface acoustic wave between the interdigital transducers $T_i$ and R, two neighbors of the propagation lanes $U_{Xi}$ being closed or partially overlapping each other. In the same way, the surface acoustic wave transducing unit Y has N propagation lanes $U_{Yi}$ (i=1, 2, ......, N) of the surface acoustic wave, two neighbors of the propagation lanes $U_{Yi}$ being closed or partially overlapping each other. The propagation lane $U_{Xi}$ is vertical to the propagation lane $U_{Yi}$.

According to another aspect of the present invention there are provided two amplifiers $A_X$ and $A_Y$. An input terminal of the switch $W_i$ in the surface acoustic wave transducing unit Y is connected with an output terminal of the interdigital transducer R in the surface acoustic wave transducing unit X via the amplifier $A_X$. An input terminal of the switch $W_i$ in the surface acoustic wave transducing unit X is connected with an output terminal of the interdigital transducer R in the surface acoustic wave transducing unit Y via the amplifier $A_Y$. The switches $W_i$ in the surface acoustic wave transducing unit X, the propagation lanes $U_{Xi}$ as delay elements, the amplifier $A_X$, the switches $W_i$ in the surface acoustic wave transducing unit Y, the propagation lanes $U_{Yi}$ as delay elements, and the amplifier $A_Y$ form N oscillators $H_i$ (i=1, 2, ....., N).

According to another aspect of the present invention there is provided a supporting board cemented to a lower end surface of the piezoelectric substrate.

According to another aspect of the present invention there is provided a piezoelectric substrate made of a piezoelectric ceramic, the polarization axis thereof being parallel to the thickness direction thereof.

According to other aspect of the present invention there is provided a surface acoustic wave position-sensing device comprising a piezoelectric substrate, a nonpiezoelectric plate, at least two surface acoustic wave transducing units X and Y, and a controlling system. Each surface acoustic wave transducing unit consists of an interdigital transducer T and N interdigital transducers $R_i$ (i=1, 2, ....., N) formed on an upper end surface of the piezoelectric substrate.

The interdigital transducer T receives an electric signal $E_T$, and excites a surface acoustic wave on an area, in contact with the interdigital transducer T, of the upper end surface of the piezoelectric substrate. The surface acoustic wave is transmitted to an area, in contact with the interdigital transducer $R_i$, of the upper end surface of the piezoelectric substrate, through the nonpiezoelectric plate. The interdigital transducers $R_i$ transduce the surface acoustic wave to electric signals $E_{Ri}$ (i=1, 2, ....., N).

The controlling system keeps a check on a magnitude of the electric signals $E_{Ri}$, senses a touch with a finger or others on an upper end surface of the nonpiezoelectric plate by a decrease or a disappearance in magnitude of the electric signals $E_{Ri}$, and picks out at least one of the interdigital transducers $R_i$ corresponding to the decrease or the disappearance in magnitude of the electric signals $E_{Ri}$.

According to a further aspect of the present invention there are provided two amplifiers $A_X$ and $A_Y$. An output terminal of the interdigital transducer $R_1$, of the interdigital transducers $R_i$ in the surface acoustic wave transducing unit Y is connected with an input terminal of the interdigital transducer T in each surface acoustic wave transducing unit. The interdigital transducer T in the surface acoustic wave transducing unit Y, the propagation lane $U_{Y1}$ as a delay element, the interdigital transducer $R_1$ in the surface acoustic wave transducing unit Y, and the amplifier AMP form an oscillator $H_1$.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
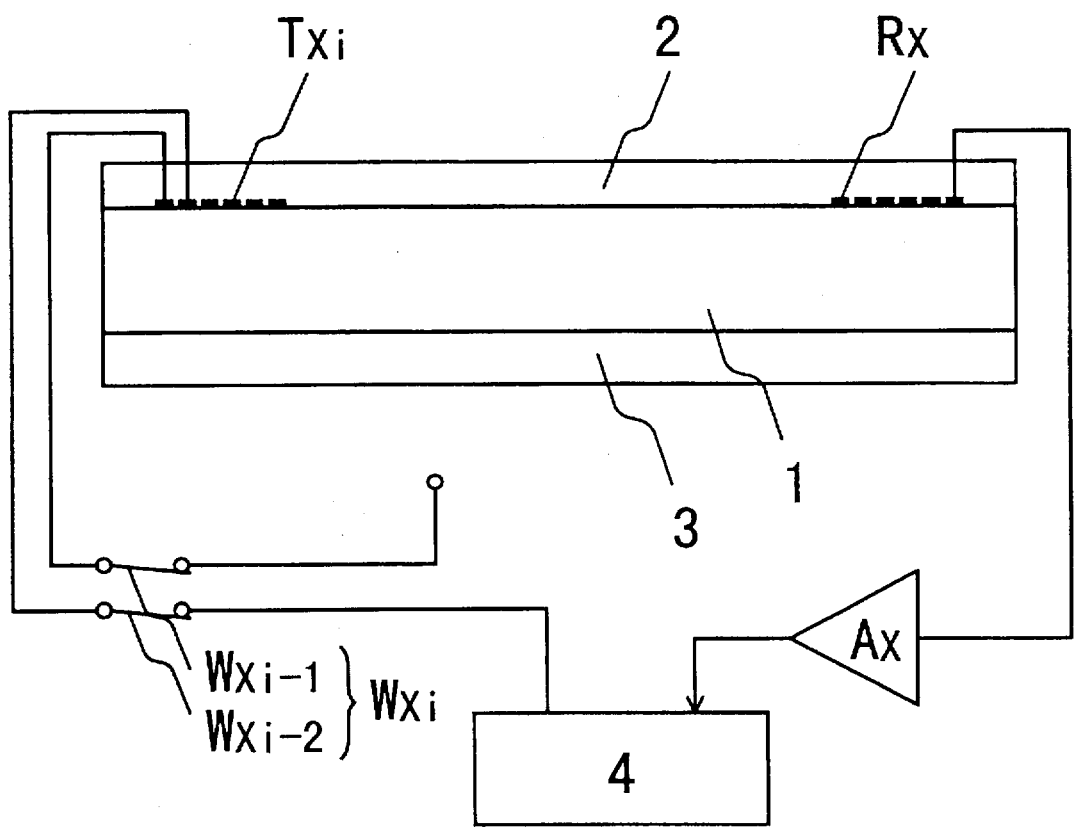
FIG. 1 shows a sectional view of the surface acoustic wave position-sensing device according to a first embodiment of a present invention.

FIG. 1 shows a sectional view of a surface acoustic wave position-sensing device according to a first embodiment of the present invention. The surface acoustic wave position-sensing device comprises piezoelectric substrate 1, nonpiezoelectric plate 2, supporting board 3, driving unit 4 and two surface acoustic wave transducing units X and Y. Surface acoustic wave transducing unit X comprises eight interdigital transducers $T_{Xi}$ (i=1, 2, ....., 8) formed on an upper end surface of piezoelectric substrate 1, interdigital transducer $R_X$ formed on the upper end surface of piezoelectric substrate 1 and eight pairs of switches $W_{Xi}$ (i=1, 2, ....., 8). Surface acoustic wave transducing unit Y comprises eight interdigital transducers $T_{Yi}$ (i=1, 2, ....., 8) formed on the upper end surface of piezoelectric substrate 1, interdigital transducer $R_Y$ formed on the upper end surface of piezoelectric substrate 1 and eight pairs of switches $W_{Yi}$ (i=1, 2, ....., 8). FIG. 1 shows only piezoelectric substrate 1, nonpiezoelectric plate 2, supporting board 3, driving unit 4 and surface acoustic wave transducing unit X. Piezoelectric substrate 1, of which material is TDK-101A (Brand name), has a dimension of 1.5 mm in thickness. Interdigital transducers $T_{Xi}$, $T_{Yi}$, $R_X$ and $R_Y$ are made from aluminium thin film. Nonpiezoelectric plate 2, made from a glass or a polymer such as acrylate resin, teflon and so on, has a dimension of 0.15 mm in thickness, and a lower end surface of nonpiezoelectric plate 2 is mounted on the upper end surface of piezoelectric substrate 1 through interdigital transducers $T_{Xi}$, $T_{Yi}$, $R_X$ and $R_Y$. When nonpiezoelectric plate 2 is made from a glass, the glass is cemented on all over the upper end surface of piezoelectric substrate 1 through an epoxy resin with thickness of about 20 μm. When nonpiezoelectric plate 2 is made from a polymer, all over the upper end surface of piezoelectric substrate 1 is coated with the polymer directly. A lower end surface of piezoelectric substrate 1 is cemented on supporting board 3.

Figure 2:
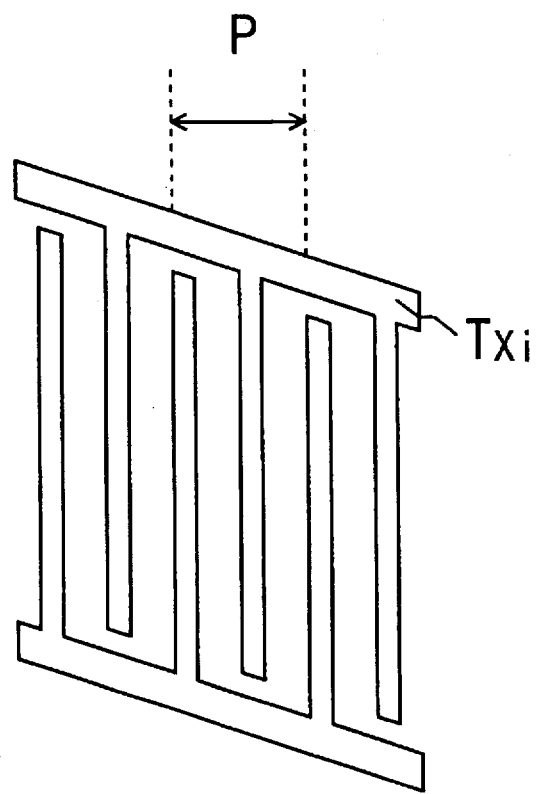
FIG. 2 shows a plan view of interdigital transducer $T_{Xi}$.

FIG. 2 shows a plan view of interdigital transducer $T_{Xi}$, consisting of ten finger pairs and having an interdigital periodicity p of 460 μm. interdigital transducer $T_{Yi}$ has the same parallelogram-type construction as interdigital transducer $T_{Xi}$. Interdigital transducers $R_X$ and $R_Y$ have the same parallelogram-type construction as interdigital transducer $T_{Xi}$, with the exception in length of electrode finger.

Figure 3:
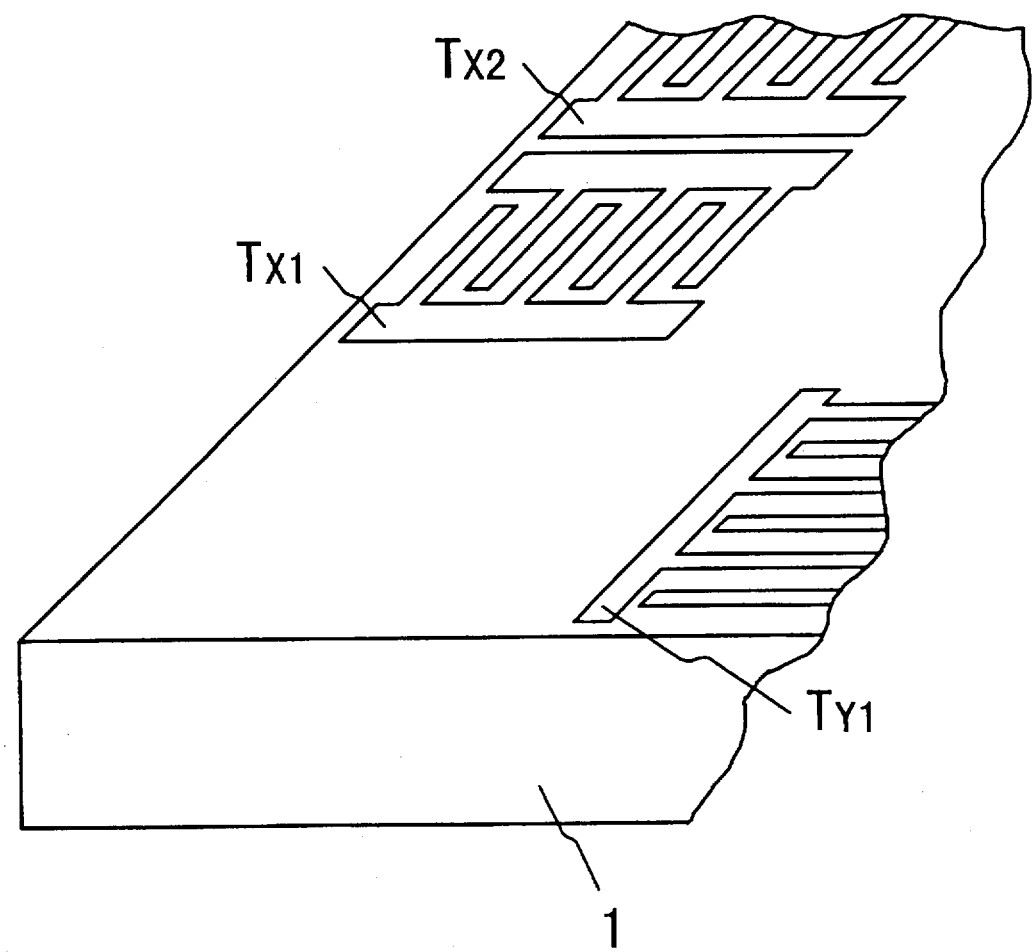
FIG. 3 shows a fragmentary perspective view of the surface acoustic wave position-sensing device in FIG. 1.

FIG. 3 shows a fragmentary perspective view of the surface acoustic wave position-sensing device in FIG. 1. FIG. 3 shows only piezoelectric substrate 1, interdigital transducers $T_{X1}$, $T_{X2}$ and $T_{Y1}$.

Figure 4:
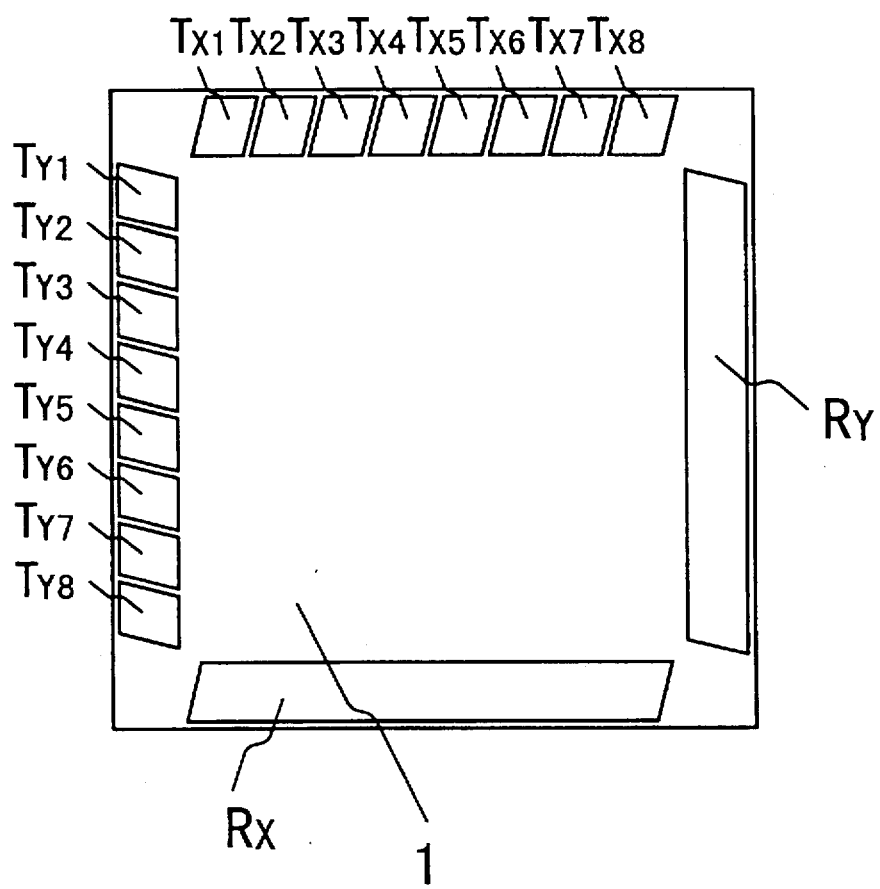
FIG. 4 shows a plan view of the surface acoustic wave position-sensing device in FIG. 1.

FIG. 4 shows a plan view of the surface acoustic wave position-sensing device in FIG. 1. FIG. 4 shows only piezoelectric substrate 1, interdigital transducers $T_{Xi}$, $T_{Yi}$, $R_X$ and $R_Y$.

Figure 5:
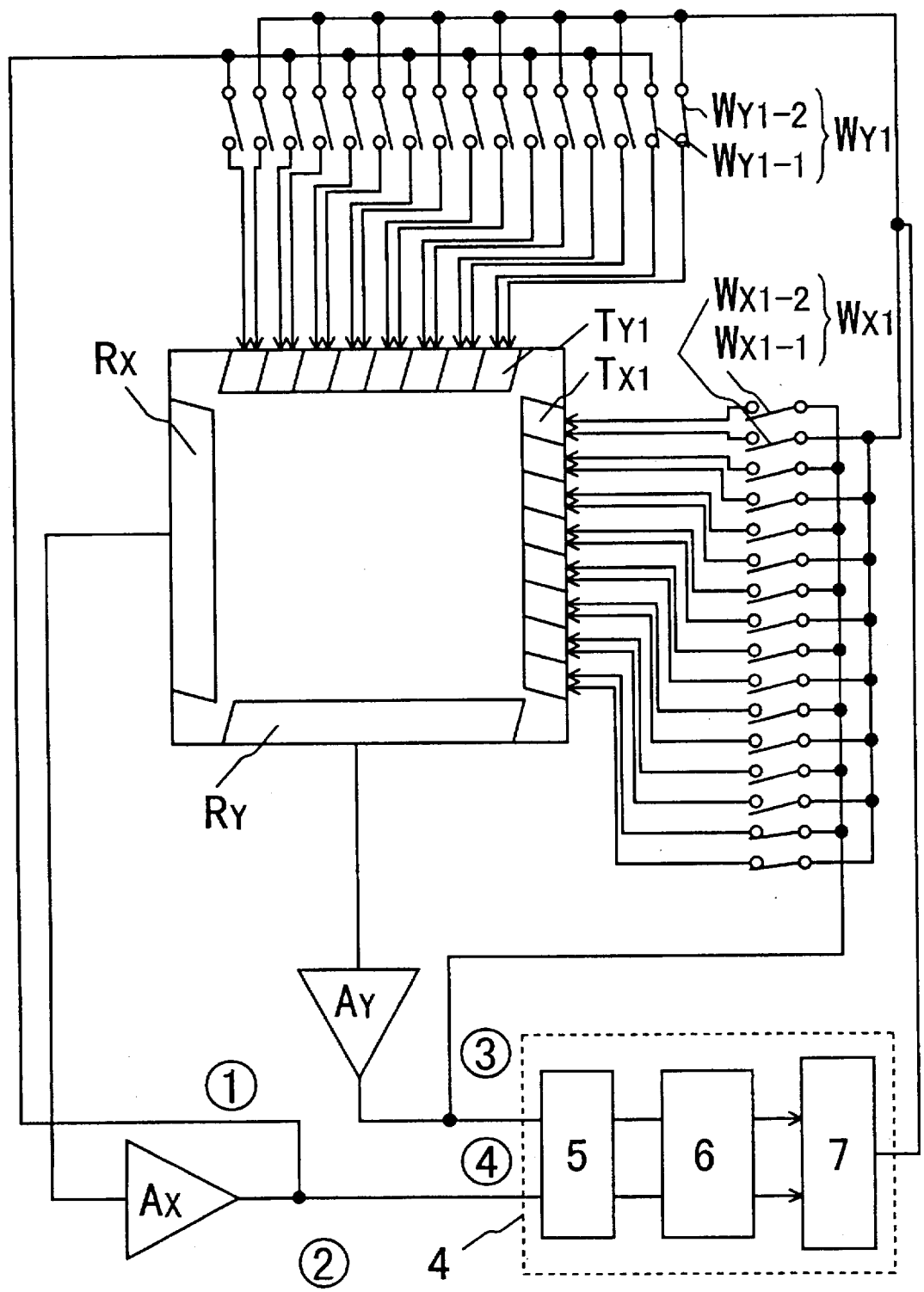
FIG. 5 shows a diagram of a driving circuit of the surface acoustic wave position-sensing device in FIG. 1.

FIG. 5 shows a diagram of a driving circuit of the surface acoustic wave position-sensing device in FIG. 1. Driving unit 4 comprises rectifier 5, comparator 6 and controlling system 7. A pair of switches $W_{Xi}$ comprises two switches $W_{Xi-1}$ and $W_{Xi-2}$, output terminals of switches $W_{Xi}\_1$, and $W_{Xi}\_2$ being connected with input terminal of interdigital transducer $T_{Xi}$. A pair of switches $W_{Yi}$ comprises two switches $W_{Yi-1}$ and $W_{Yi-2}$, output terminals of switches $W_{Yi-1}$ and $W_{Yi-2}$ being connected with input terminal of interdigital transducer $T_{Yi}$. Input terminal of switch $W_{Xi-1}$ is connected with output terminal of interdigital transducer $R_Y$ via amplifier $A_Y$. Input terminal of switch $W_{Yi-1}$ is connected with output terminal of interdigital transducer $R_X$ via amplifier $A_X$. Input terminals of switches $W_{Xi-2}$ and $W_{Yi-2}$ are connected with output terminal of controlling system 7.

When operating the surface acoustic wave position-sensing device in FIG. 1, an electric signal $E_T$ having a frequency approximately corresponding to the interdigital periodicity p of interdigital transducer $T_{Xi}$ is applied to interdigital transducer $T_{Xi}$ via a pair of switches $W_{Xi}$. In this time, the surface acoustic wave, of the zeroth mode and the higher order modes, having the wavelength approximately equal to the interdigital periodicity p of interdigital transducer $T_{Xi}$, is excited on an area, in contact with interdigital transducer $T_{Xi}$, of the upper end surface of piezoelectric substrate 1. The surface acoustic wave excited on the area of the upper end surface of piezoelectric substrate 1 is transmitted to an upper end surface of nonpiezoelectric plate 2.

If the phase velocity of the zeroth mode surface acoustic wave is approximately equal to the phase velocity of the Rayleigh wave traveling on piezoelectric substrate 1 alone under electrically shorted condition, and the phase velocity of the higher order mode surface acoustic wave is approximately equal to the phase velocity of the Rayleigh wave traveling on piezoelectric substrate 1 alone under electrically opened condition, the transducing efficiency from the electric signal $E_T$ to the surface acoustic wave increases.

If the thickness of piezoelectric substrate 1 is larger than three times the interdigital periodicity p of interdigital transducer $T_{Xi}$, and the thickness d of nonpiezoelectric plate 2 is smaller than the interdigital periodicity p, the surface acoustic wave excited on the area, in contact with interdigital transducer $T_{Xi}$, of the upper end surface of piezoelectric substrate 1, is transmitted to nonpiezoelectric plate 2 effectively. In addition, it is possible to support the lower end surface of piezoelectric substrate 2 directly.

If using a material, as nonpiezoelectric plate 2, such that the phase velocity of the surface acoustic wave traveling on nonpiezoelectric plate 2 alone is lower than that traveling on piezoelectric substrate 1 alone, the surface acoustic wave is transmitted to nonpiezoelectric plate 2 effectively without a leakage of the surface acoustic wave on the inside of piezoelectric substrate 1. Accordingly, it is possible to operate the surface acoustic wave position-sensing device in FIG. 1 under low power consumption with low voltage, and in addition, it is possible to support the lower end surface of piezoelectric substrate 1 directly.

If using a piezoelectric ceramic having the polarization axis parallel to the thickness direction thereof, as piezoelectric substrate 1, the surface acoustic wave of the zeroth mode and the higher order modes is excited on the area, in contact with interdigital transducer $T_{Xi}$, of the upper end surface of piezoelectric substrate 1 effectively, and the transducing efficiency from the electric signal $E_T$ to the surface acoustic wave increases.

Interdigital transducer $R_X$ is located so that the surface acoustic wave transmitting direction from interdigital transducer $T_{Xi}$ and the surface acoustic wave receiving direction at interdigital transducer $R_X$ overlap each other, as shown in FIG. 4. Therefore, the surface acoustic wave, of the zeroth mode and the higher order modes, having the wavelength approximately equal to the interdigital periodicity p of interdigital transducer $R_X$, is transmitted through nonpiezoelectric plate 2 to an area, in contact with interdigital transducer $R_X$, of the upper end surface of piezoelectric substrate 1, and is transduced to an electric signal $E_R$ having a frequency approximately corresponding to the interdigital periodicity p of interdigital transducer $R_X$ at interdigital transducer $R_X$.

If the phase velocity of the zeroth mode surface acoustic wave is approximately equal to the phase velocity of the Rayleigh wave traveling on piezoelectric substrate 1 alone under the electrically shorted condition, and the phase velocity of the higher order mode surface acoustic wave is approximately equal to the phase velocity of the Rayleigh wave traveling on piezoelectric substrate 1 alone under the electrically opened condition, the transducing efficiency from the surface acoustic wave to the electric signal $E_R$ increases, and the electric signal $E_R$ is delivered at interdigital transducer $R_X$ with a quick response time.

If the thickness of piezoelectric substrate 1 is larger than three times the interdigital periodicity p of interdigital transducer $R_X$, and the thickness d of nonpiezoelectric plate 2 is smaller than the interdigital periodicity p, the surface acoustic wave transmitted to nonpiezoelectric plate 2 is delivered as the electric signal $E_R$ at interdigital transducer $R_X$ effectively without a leakage of the surface acoustic wave on the inside of piezoelectric substrate 1. Accordingly, it is possible to operate the surface acoustic wave position-sensing device in FIG. 1 under low power consumption with low voltage, and in addition, it is possible to support the lower end surface of piezoelectric substrate 1 directly.

If using a material, as nonpiezoelectric plate 2, such that the phase velocity of the surface acoustic wave traveling on nonpiezoelectric plate 2 alone is lower than that traveling on piezoelectric substrate 1 alone, the surface acoustic wave transmitted to nonpiezoelectric plate 2 is delivered as the electric signal $E_R$ at interdigital transducer $R_X$ effectively without a leakage of the surface acoustic wave on the inside of piezoelectric substrate 1. Therefore, it is possible to support the lower end surface of piezoelectric substrate 1 directly.

If using a piezoelectric ceramic having the polarization axis parallel to the thickness direction thereof, as piezoelectric substrate 1, the surface acoustic wave in nonpiezoelectric plate 2 is transmitted to the area, in contact with interdigital transducer $R_X$, of the upper end surface of piezoelectric substrate 1 effectively, and the transducing efficiency from the surface acoustic wave to the electric signal $E_R$ increases.

The electric signal $E_R$ is amplified via amplifier $A_X$. An electric signal ①, which is a part of the amplified electric signal via amplifier $A_X$ and is corresponding to the electric signal $E_T$, is applied to interdigital transducer $T_{H}$ via switch $W_{H-1}$. An electric signal ②, which is the remaining part of the amplified electric signal via amplifier $A_X$, is transmitted to controlling system 7 via rectifier 5 and comparator 6, and then applied to interdigital transducers $T_{Xi}$ and $T_{H}$ via switches $W_{X-2}$ and $W_{H-2}$. Surface acoustic wave transducing unit Y is equivalent to surface acoustic wave transducing unit X. Thus, when the electric signal ① is applied to interdigital transducer $T_{H}$, the surface acoustic wave, of the zeroth mode and the higher order modes having the wavelength approximately equal to the interdigital periodicity p of interdigital transducer $T_{H}$, is excited on an area, in contact with interdigital transducer $T_{H}$, of the upper end surface of piezoelectric substrate 1. The surface acoustic wave is transmitted to the upper end surface of nonpiezoelectric plate 2. The surface acoustic wave, having the wavelength approximately equal to the interdigital periodicity p of interdigital transducer $R_Y$, is transmitted through nonpiezoelectric plate 2 to an area, in contact with interdigital transducer $R_Y$, of the upper end surface of piezoelectric substrate 1, and is transduced to an electric signal $E_R$ having a frequency approximately corresponding to the interdigital periodicity p of interdigital transducer $R_Y$. The electric signal $E_R$ is delivered at interdigital transducer $R_Y$, and is amplified via amplifier $A_Y$. An electric signal ③, which is a part of the amplified electric signal via amplifier $A_Y$ is applied to interdigital transducer $T_{Xi}$ via switch $W_{Xi-1}$. An electric signal ④, which is the remaining part of the amplified electric signal via amplifier $A_Y$, is transmitted to controlling system 7 via rectifier 5 and comparator 6, and then applied to interdigital transducers $T_{Xi}$ and $T_{H}$ via switches $W_{Xi-2}$ and $W_{H-2}$. Thus, switch $W_{Xi-1}$, eight propagation lanes $U_{Xi}$ (i=1, 2, ......, 8) of the surface acoustic wave between interdigital transducers $T_{Xi}$ and $R_X$, amplifier $A_X$, switch $W_{H-1}$, eight propagation lanes $U_H$ (i=1, 2, ......, 8) of the surface acoustic wave between interdigital transducer $T_H$ and $R_Y$, and amplifier $A_Y$ form eight oscillators $H_i$ (i=1, 2, ......, 8). Oscillator $H_i$ enables the surface acoustic wave position-sensing device in FIG. 1 to have a small-sized circuit with a simple structure. The small-sized circuit causes the surface acoustic wave position-sensing device to have a small size which is very light in weight, and to be operated under low power consumption with low voltage.

Controlling system 7 in driving unit 4 plays four roles. The first role is to turn on and off eight pairs of switches $W_{Xi}$ with a fixed period in turn, and eight pairs of switches $W_H$ with a fixed period in turn, eight pairs of switches $W_{Xi}$ being closed in turn while a pair of switches $W_H$ is closed. In this time, switches $W_{Xi-1}$ and $W_{Xi-2}$ are in the same condition each other, and switches $W_{H-1}$ and $W_{H-2}$ are in the same condition each other. The second role is to keep a check on a magnitude of the electric signal $E_R$. The third role is to sense a touch with a finger or others on the upper end surface of nonpiezoelectric plate 2 by a decrease or a disappearance in magnitude of the electric signal $E_R$, the upper end surface of nonpiezoelectric plate 2 being called a touch face from now on. The fourth role is to pick out one of switches $W_{Xi}$ closed when a decrease or a disappearance in magnitude of the electric signal $E_R$ happens, and one of switches $W_H$ closed when a decrease or a disappearance in magnitude of the electric signal $E_R$ happens. If touching a crossing point of propagation lanes $U_{Xi}$ and $U_H$ on the touch face with a pen, the surface acoustic wave is intercepted at the crossing point. Therefore, the magnitude of the electric signal $E_R$ at interdigital transducer $R_X$ and the magnitude of the electric signal $E_R$ at interdigital transducer $R_Y$ decrease or disappear.

Thus, it is possible to sense a touch with the pen on the touch face, moreover, to specify a touch-position corresponding to the crossing point with a high sensitivity and a quick response time. If touching, for example, a crossing point of propagation lanes $U_{X3}$ and $U_{Y5}$, a decrease or a disappearance in magnitude of the electric signal $E_R$ at interdigital transducer $R_X$ happens only when switch $W_{X3}$ is closed, and a decrease or a disappearance in magnitude of the electric signal $E_R$ at interdigital transducer $R_Y$ happens only when switch $W_{Y5}$ is closed. Thus, it is possible to specify a touch-position on the touch face by picking out switch $W_{Xi}$ closed when a decrease or a disappearance in magnitude of the electric signal $E_R$ at interdigital transducer $R_X$ happens, and switch $W_H$ closed when a decrease or a disappearance in magnitude of the electric signal $E_R$ at interdigital transducer $R_Y$ happens.

Each interdigital transducer has the parallelogram-type construction as shown in FIG. 2. Besides, interdigital transducers $T_{Xi}$ are arranged as they stand in a line, and interdigital transducers $T_H$ are similar to interdigital transducers $T_{Xi}$ as shown in FIG. 4. Therefore, two neighbors of propagation lanes $U_{Xi}$ are closed, and two neighbors of propagation lanes $U_H$ are also closed, so that there is no gap between two neighbors of propagation lanes $U_{Xi}$, and between two neighbors of propagation lanes $U_H$. Thus, all the touch face is of practical use, in other words, a response to a touch on the touch face is obtained without fail. As a result, it is possible to specify a touch-position on the touch face with precision. In addition, in case that two neighbors of propagation lanes $U_{Xi}$ are partially overlapping each other, the two neighbors of propagation lanes $U_{Xi}$ are specified if touching an overlapping area of the two neighbors of propagation lanes $U_{Xi}$ on the touch face. Accordingly, it becomes clear that the touch-position on the touch face is located between the two neighbors of propagation lanes $U_{Xi}$. Regarding two neighbors of propagation lanes $U_H$ partially overlapping each other, the touch-position is specified in the same way.

Figure 6:
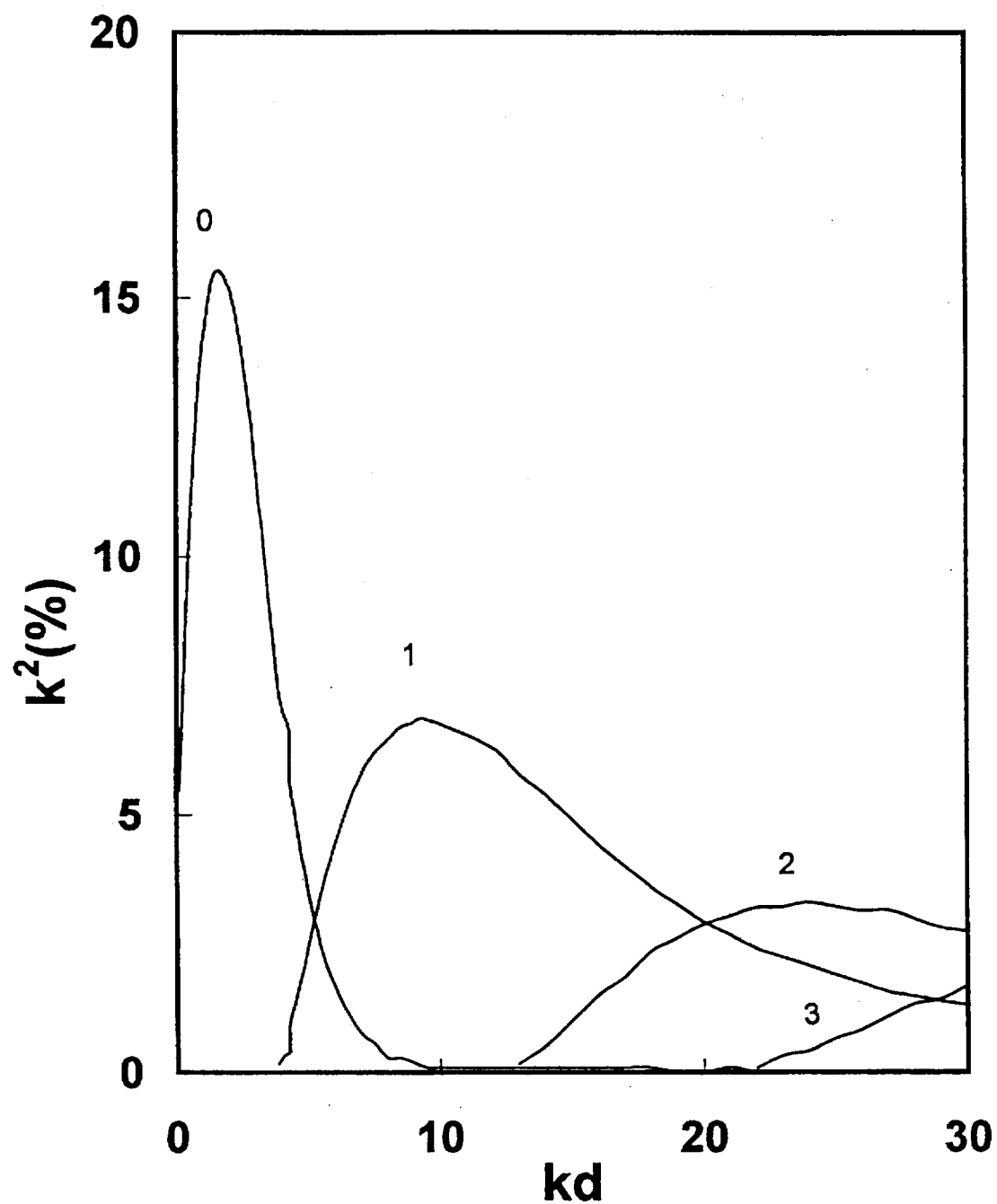
FIG. 6 shows a relationship between the electromechanical coupling constant $k^2$ and the product kd of the wave number k of the surface acoustic wave and the thickness d of nonpiezoelectric plate 2.

FIG. 6 shows a relationship between the electromechanical coupling constant $k^2$ calculated from the difference between the phase velocity under electrically opened condition and that under electrically shorted condition of piezoelectric substrate 1, and the product kd of the wave number k of the surface acoustic wave and the thickness d of nonpiezoelectric plate 2. In FIG. 6, nonpiezoelectric plate 2 is made from a glass having a shear wave velocity of 2297 m/s and a longitudinal wave velocity of 4156 m/s traveling on the glass alone. The velocities of 2297 m/s and 4156 m/s are about 0.9 times the velocities of a shear- and a longitudinal waves, 2340 m/s and 4390 m/s, respectively, in piezoelectric substrate 1 alone. An electric energy applied to interdigital transducer $T_{Xi}$ or $T_H$ is most easily transduced to the zeroth mode surface acoustic wave when the kd value is approximately 1.6, then the $k^2$ value is approximately 15.5% being the maximum value. An electric energy applied to interdigital transducer $T_{Xi}$ or $T_H$ is also transduced to the surface acoustic wave with more difficulty in proportion to the higher order modes. It is clear that the $k^2$ value of 15.5% is worthy in comparison that a crystallized $LiNbO_3$ used as a popular piezoelectric body for exciting the surface acoustic wave generally has the $k^2$ value of approximately 5%.

Figure 7:
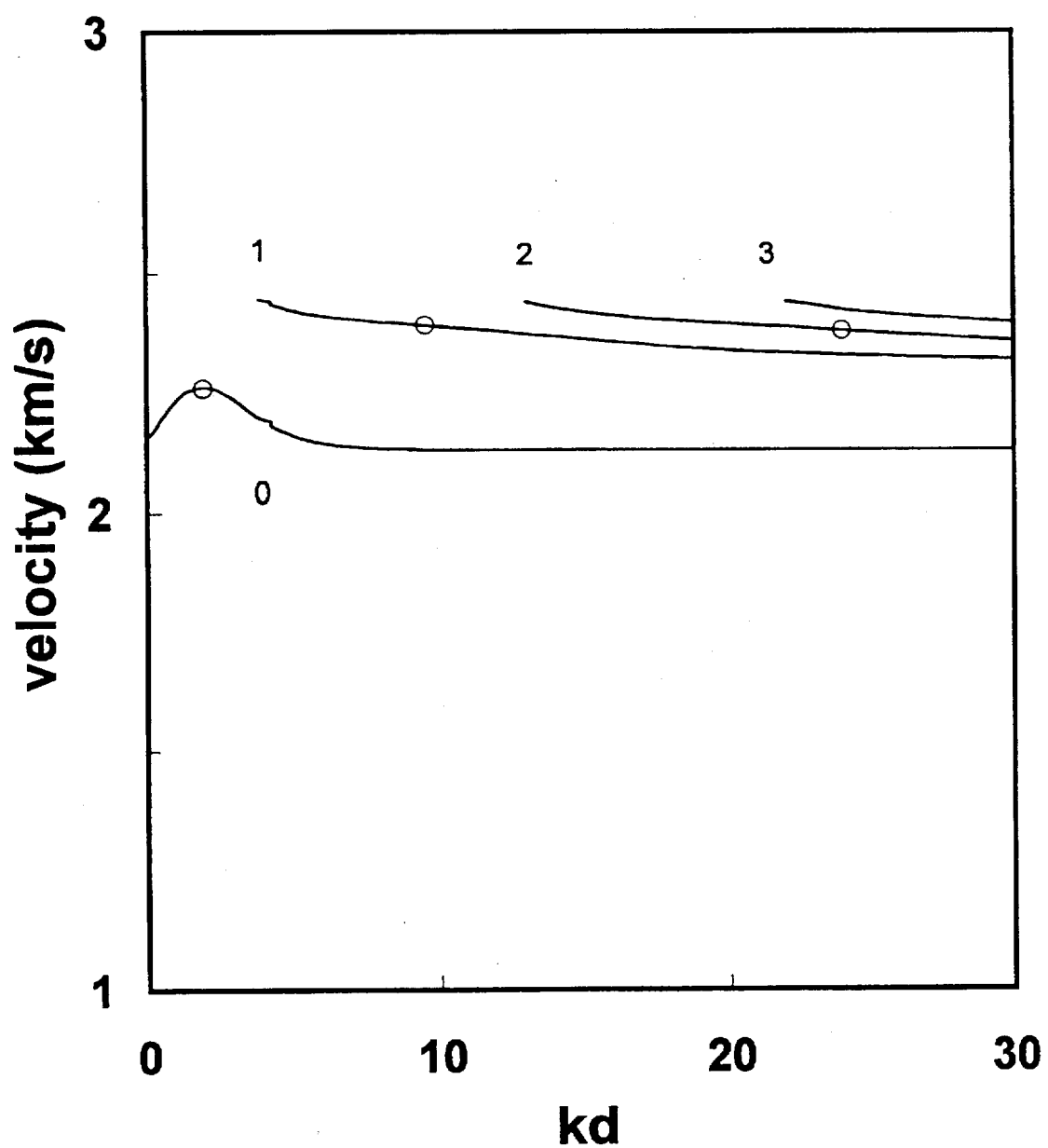
FIG. 7 shows a relationship between the phase velocity of the surface acoustic wave for each mode on the upper end surface of piezoelectric substrate 1, and the kd value.

FIG. 7 shows a relationship between the phase velocity of the surface acoustic wave for each mode on the upper end surface of piezoelectric substrate 1, and the kd value. In FIG. 7, nonpiezoelectric plate 2 is made from the same glass as FIG. 6. There is a cut-off frequency for each higher order mode, except for the zeroth mode. The kd value at each mark ○ has the maximum $k^2$ value where an electric energy applied to interdigital transducer $T_{Xi}$ or $T_{Yi}$ is most easily transduced to the surface acoustic wave, the maximum $k^2$ value being obtained from FIG. 6. The phase velocity of the zeroth mode surface acoustic wave at the mark ○ is 2170 m/s, which is approximately equal to the phase velocity of the Rayleigh wave traveling on piezoelectric substrate 1 alone under the electrically shorted condition, the phase velocity of the Rayleigh wave being 2150 m/s. The phase velocity of the higher order mode surface acoustic wave at the mark ○ is approximately 2370 m/s, which is approximately equal to the Rayleigh wave velocity traveling on piezoelectric substrate 1 alone under the electrically opened condition.

Figure 8:
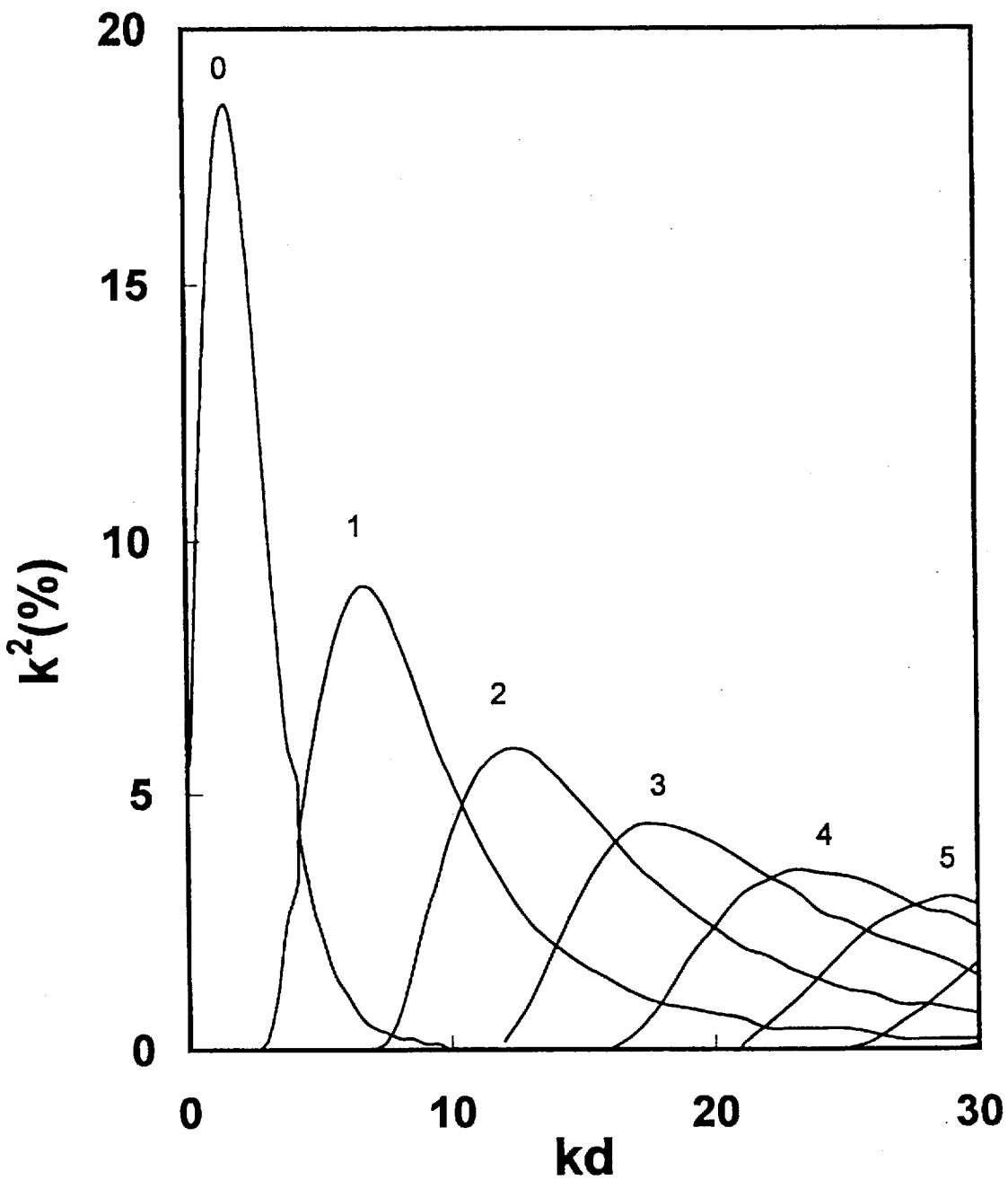
FIG. 8 shows a relationship between the $k^2$ value and the kd value.

FIG. 8 shows a relationship between the $k^2$ value and the kd value. In FIG. 8, nonpiezoelectric plate 2 is made from a glass having a shear wave velocity of 1989 m/s and a longitudinal wave velocity of 3598 m/s traveling on the glass alone. The velocities of 1989 m/s and 3598 m/s are about 0.8 times the velocities of a shear- and a longitudinal waves, 2340 m/s and 4390 m/s, respectively, in piezoelectric substrate 1 alone. An electric energy applied to interdigital transducer $T_{Xi}$ or $T_{Yi}$ is most easily transduced to the zeroth mode surface acoustic wave when the kd value is approximately 1.6, then the $k^2$ value is approximately 18.5% being the maximum value. An electric energy applied to interdigital transducer $T_{Xi}$ or $T_{Yi}$ is also transduced to the surface acoustic wave with more difficulty in proportion to the higher order modes.

Figure 9:
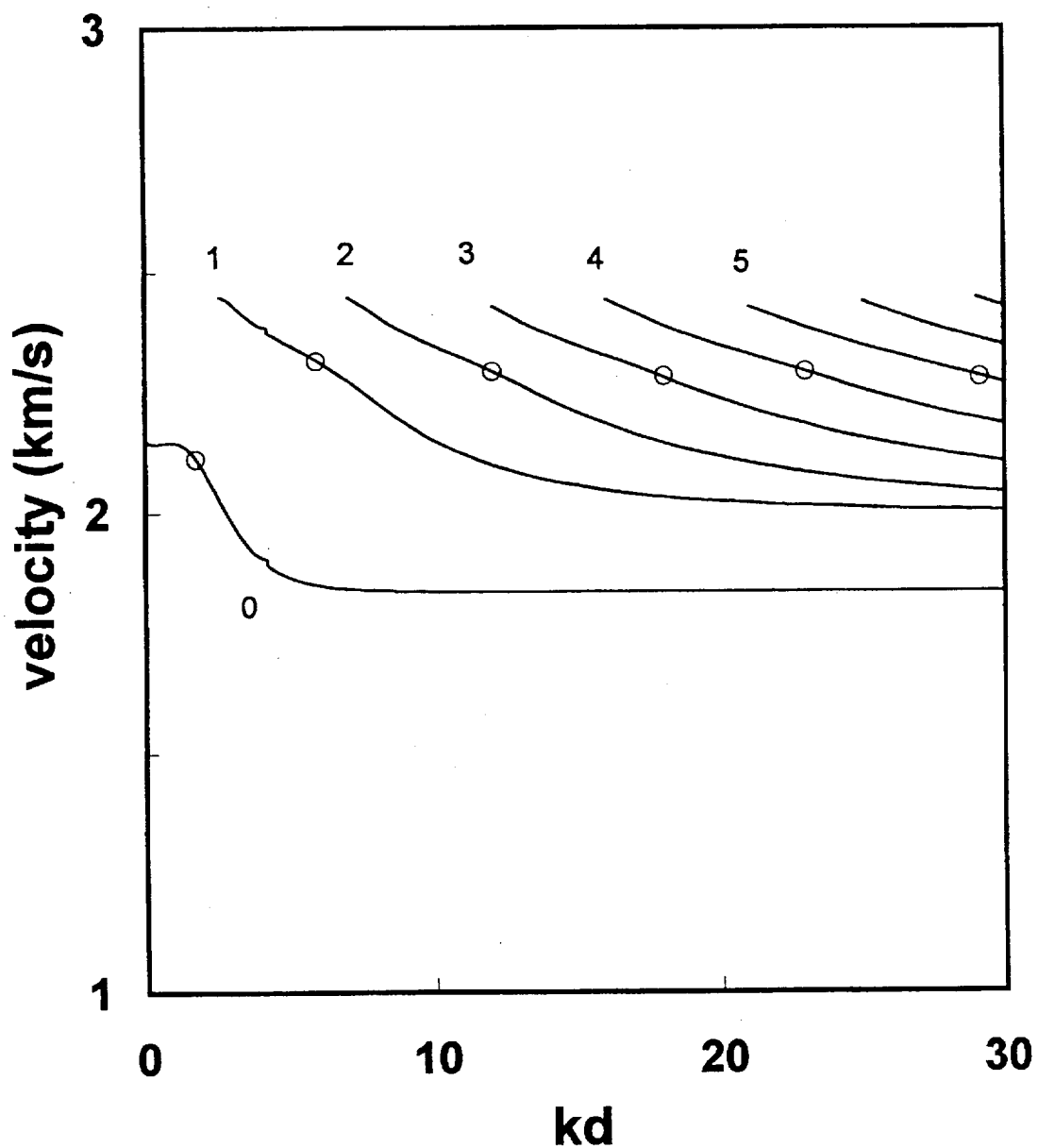
FIG. 9 shows a relationship between the phase velocity of the surface acoustic wave for each mode on the upper end surface of piezoelectric substrate 1, and the kd value.

FIG. 9 shows a relationship between the phase velocity of the surface acoustic wave for each mode on the upper end surface of piezoelectric substrate 1, and the kd value. In FIG. 9, nonpiezoelectric plate 2 is made from the same glass as FIG. 8. There is a cut-off frequency for each higher order mode, except for the zeroth mode. The kd value at each mark ○ has the maximum $k^2$ value where an electric energy applied to interdigital transducer $T_{Xi}$ or $T_{Yi}$ is most easily transduced to the surface acoustic wave, the maximum $k^2$ value being obtained from FIG. 8. The phase velocity of the zeroth mode surface acoustic wave at the mark ○ is 2095 m/s, which is lower than the phase velocity (2170 m/s) of the zeroth mode surface acoustic wave in FIG. 7, and is approximately equal to the phase velocity of the Rayleigh wave traveling on piezoelectric substrate 1 alone under the electrically shorted condition, the phase velocity of the Rayleigh wave being 2150 m/s. The phase velocity of the higher order mode surface acoustic wave at the mark ○ is approximately 2300 m/s, which is lower than the phase velocity (2370 m/s) of the higher order mode surface acoustic wave in FIG. 7, and is approximately equal to the Rayleigh wave velocity traveling on piezoelectric substrate 1 alone under the electrically opened condition, the phase velocity of the Rayleigh wave being 2340 m/s.

It is clear from FIGS. 6–9 that an electric energy applied to interdigital transducer $T_{Xi}$ or $T_{Yi}$ is most easily transduced to the zeroth mode surface acoustic wave having the phase velocity approximately equal to the phase velocity of the Rayleigh wave traveling on piezoelectric substrate 1 alone under the electrically shorted condition, and is transduced to the higher order mode surface acoustic wave having the phase velocity approximately equal to the phase velocity of the Rayleigh wave traveling on piezoelectric substrate 1 alone under the electrically opened condition. In addition, the velocity of the surface acoustic wave for each mode, transmitted from piezoelectric substrate 1 to nonpiezoelectric plate 2 becomes lower, when using a material, as nonpiezoelectric plate 2, where the velocity of the shear wave and the longitudinal wave traveling on the material alone is lower. In the same way, the zeroth mode surface acoustic wave having the phase velocity approximately equal to the phase velocity of the Rayleigh wave traveling on piezoelectric substrate 1 alone under the electrically shorted condition is most easily transduced to an electric signal at interdigital transducer $R_X$ or $R_Y$. The higher order mode surface acoustic wave having the phase velocity approximately equal to the phase velocity of the Rayleigh wave traveling on piezoelectric substrate 1 alone under the electrically opened condition is transduced to an electric signal sufficiently.

Figure 10:
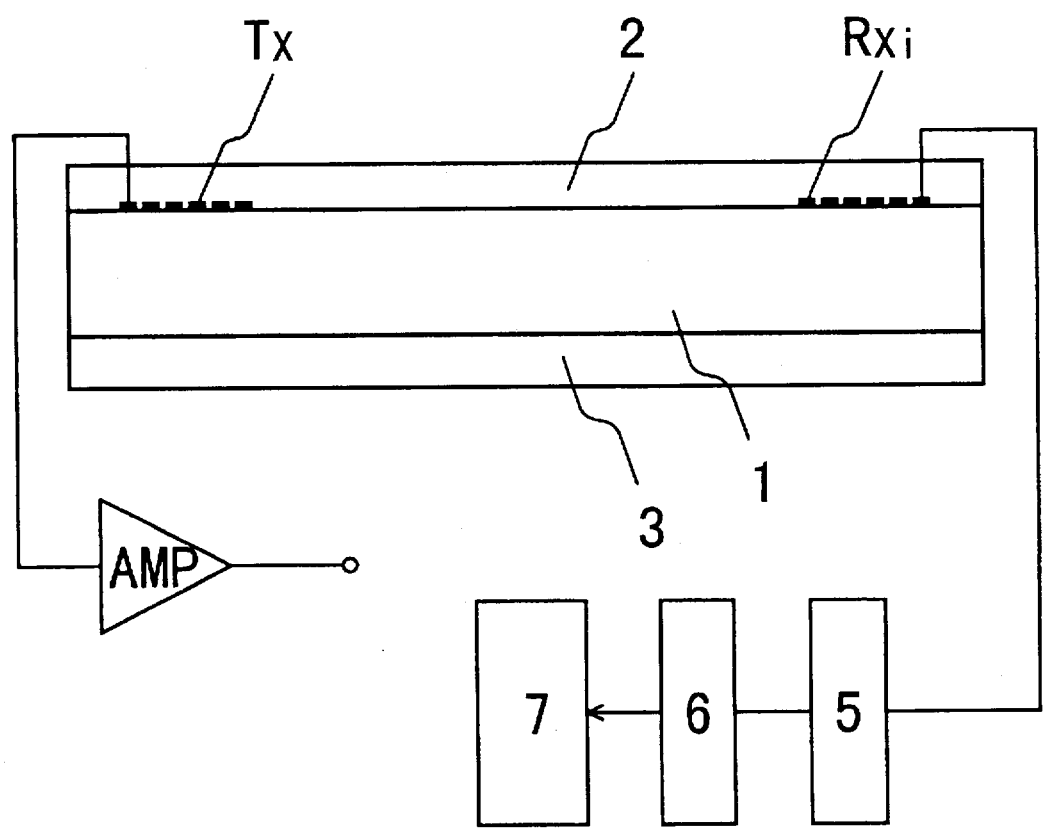
FIG. 10 shows a sectional view of a surface acoustic wave position-sensing device according to a second embodiment of the present invention.

FIG. 10 shows a sectional view of a surface acoustic wave position-sensing device according to a second embodiment of the present invention. The surface acoustic wave position-sensing device in FIG. 10 comprises piezoelectric substrate 1, nonpiezoelectric plate 2, supporting board 3, rectifier 5, comparator 6, controlling system 7, amplifier AMP, surface acoustic wave transducing units X and Y. The surface acoustic wave transducing unit X in FIG. 10 comprises interdigital transducer $T_X$ formed on the upper end surface of piezoelectric substrate 1, and 16 interdigital transducers $R_{Xi}$ (i=1,2, ......, 16) formed on the upper end surface of piezoelectric substrate 1. The surface acoustic wave transducing unit Y in FIG. 10 comprises interdigital transducer $T_Y$ formed on the upper end surface of piezoelectric substrate 1, and 16 interdigital transducers $R_{Yi}$ (i=1,2, ......, 16) formed on the upper end surface of piezoelectric substrate 1. FIG. 10 shows only piezoelectric substrate 1, nonpiezoelectric plate 2, supporting board 3, rectifier 5, comparator 6, controlling system 7, amplifier AMP and surface acoustic wave transducing unit X. Interdigital transducers $T_X$, $T_Y$, $R_{Yi}$, made from aluminium thin film, are mounted on piezoelectric substrate 1. Nonpiezoelectric plate 2 is mounted on the upper end surface of piezoelectric substrate 1 through interdigital transducers $T_X$, $T_Y$, $R_{Xi}$ and $R_{Yi}$. The lower end surface of piezoelectric substrate 1 is cemented on supporting board 3.

Figure 11:
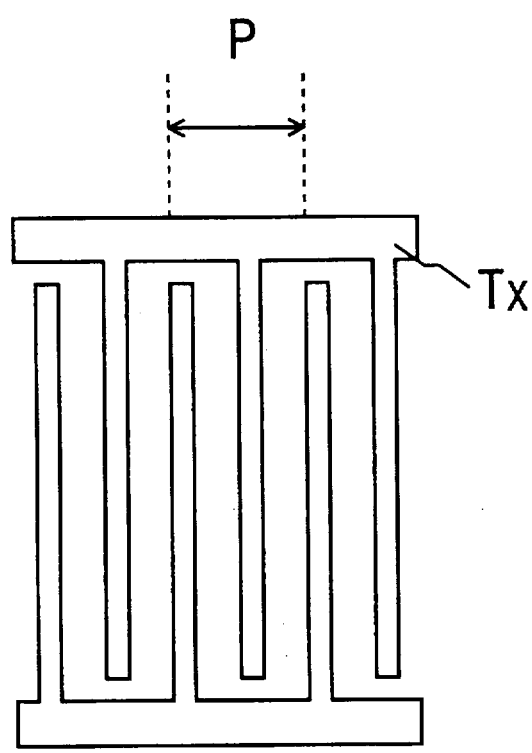
FIG. 11 shows a plan view of interdigital transducer $T_X$.

FIG. 11 shows a plan view of interdigital transducer $T_X$, consisting of ten finger pairs and having an interdigital periodicity p of 460 μm. Interdigital transducer $T_Y$ has the same regular-type construction as interdigital transducer $T_X$. Interdigital transducers $R_{Xi}$ and $R_{Yi}$ have the same construction as interdigital transducer $T_X$, with the exception in length of electrode finger.

Figure 12:
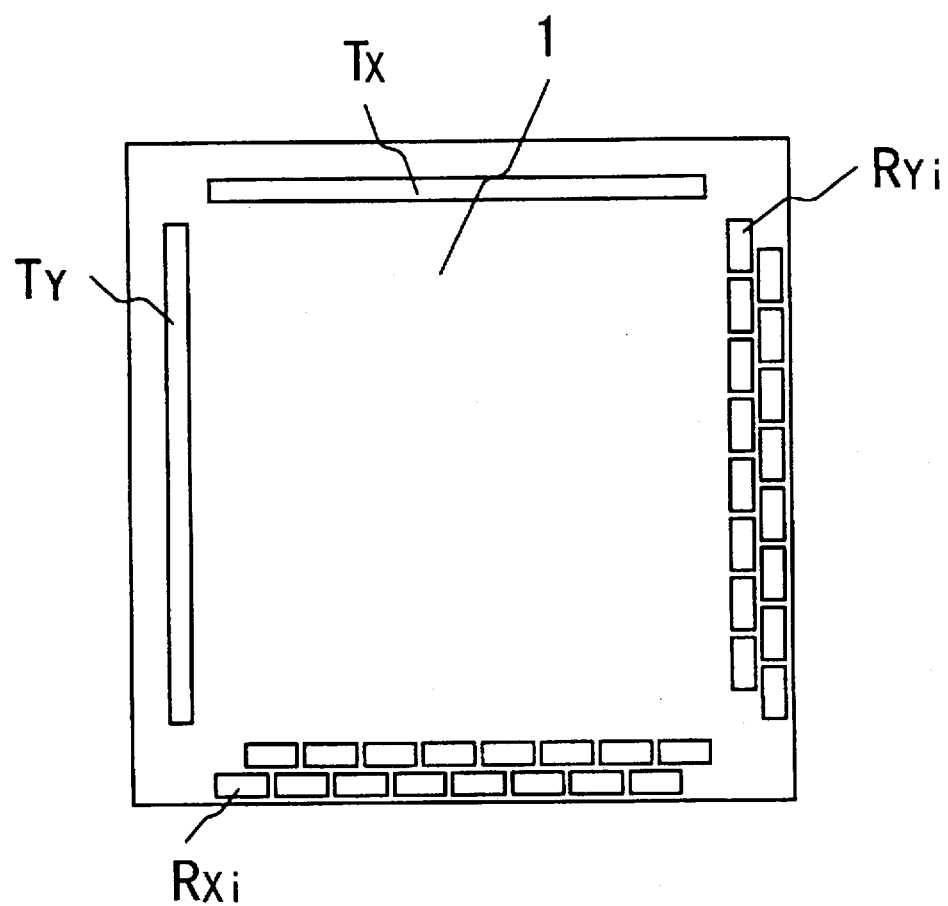
FIG. 12 shows a plan view of the surface acoustic wave position-sensing device in FIG. 10.

FIG. 12 shows a plan view of the surface acoustic wave position-sensing device in FIG. 10. FIG. 12 shows only piezoelectric substrate 1, interdigital transducers $T_X$, $T_Y$, $R_{Xi}$ and $R_{Yi}$.

Figure 13:
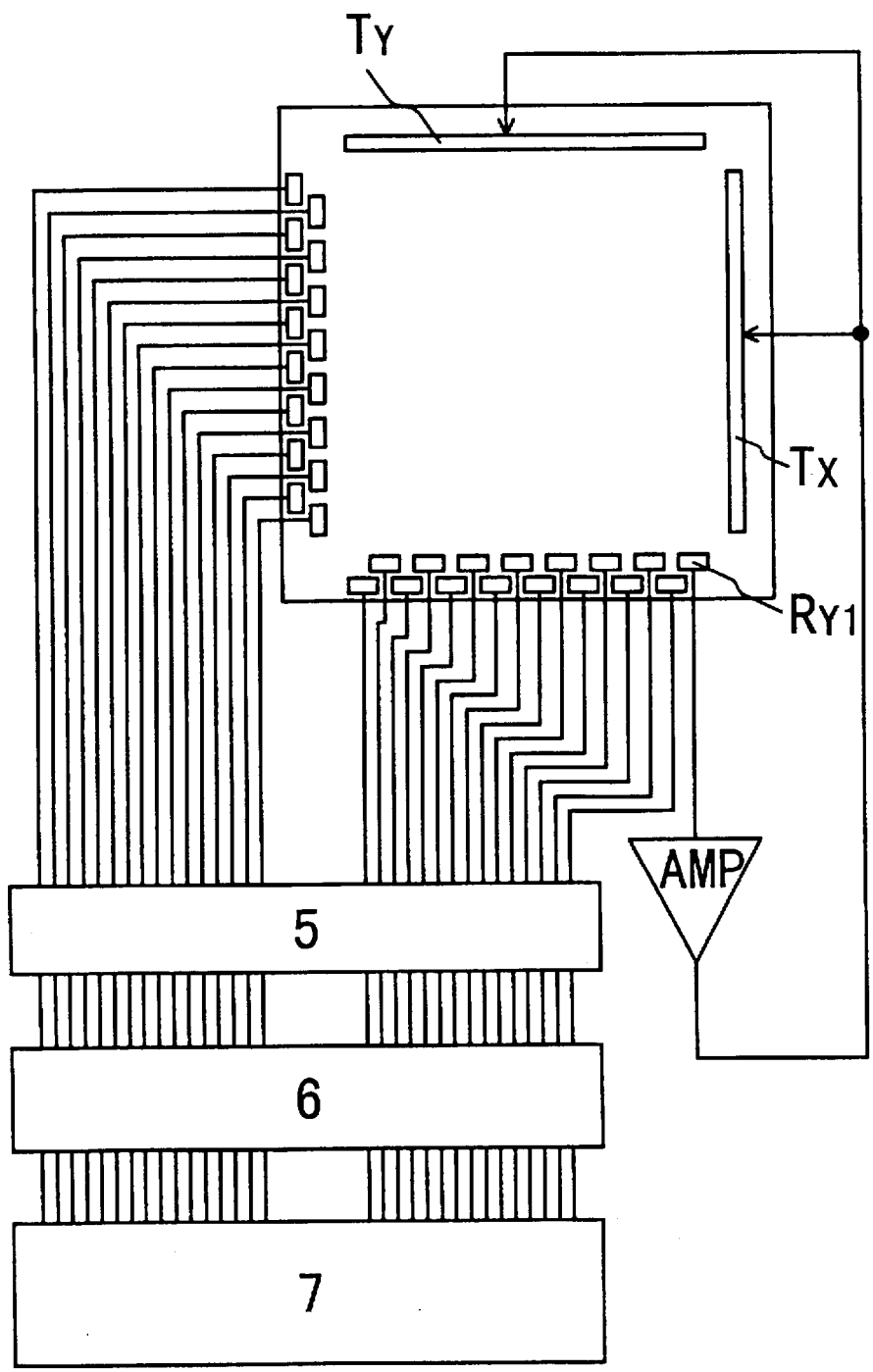
FIG. 13 shows a diagram of a driving circuit of the surface acoustic wave position-sensing device in FIG. 10.

FIG. 13 shows a diagram of a driving circuit of the surface acoustic wave position-sensing device in FIG. 10. Interdigital transducer $R_{Y1}$ of interdigital transducers $R_{Yi}$ is connected with amplifier AMP. When operating the surface acoustic wave position-sensing device in FIG. 10, an electric signal $E_T$ having a frequency approximately corresponding to an interdigital periodicity p of interdigital transducer $T_Y$ is applied to interdigital transducer $T_Y$. In this time, the surface acoustic wave, of the zeroth mode and the higher order modes having the wavelength approximately equal to the interdigital periodicity p of interdigital transducer $T_Y$, is excited on an area, in contact with interdigital transducer $T_Y$, of the upper end surface of piezoelectric substrate 1. The surface acoustic wave excited on the area of the upper end surface of piezoelectric substrate 1 is transmitted to the upper end surface of nonpiezoelectric plate 2.

If the phase velocity of the zeroth mode surface acoustic wave is approximately equal to the phase velocity of the Rayleigh wave traveling on piezoelectric substrate 1 alone under the electrically shorted condition, and the phase velocity of the higher order mode surface acoustic wave is approximately equal to the phase velocity of the Rayleigh wave traveling on piezoelectric substrate 1 alone under the electrically opened condition, the transducing efficiency from the electric signal $E_T$ to the surface acoustic wave increases.

If the thickness of piezoelectric substrate 1 is larger than three times the interdigital periodicity p of interdigital transducer $T_Y$, and the thickness d of nonpiezoelectric plate 2 is smaller than interdigital periodicity p, the surface acoustic wave excited on the area, in contact with interdigital transducer $T_Y$, of the upper end surface of piezoelectric substrate 1, is transmitted to nonpiezoelectric plate 2 effectively.

If using a material, as nonpiezoelectric plate 2, such that the phase velocity of the surface acoustic wave traveling on nonpiezoelectric plate 2 alone is lower than that traveling on piezoelectric substrate 1 alone, the surface acoustic wave is transmitted to nonpiezoelectric plate 2 effectively without a leakage of the surface acoustic wave on the inside of piezoelectric substrate 1. Accordingly, it is possible to operate the surface acoustic wave position-sensing device in FIG. 10 under low power consumption with low voltage, and to support the lower end surface of piezoelectric substrate 1 directly.

If using a piezoelectric ceramic having the polarization axis parallel to the thickness direction thereof, as piezoelectric substrate 1, the surface acoustic wave of the zeroth mode and the higher order modes is excited on the area, in contact with interdigital transducer $T_Y$, of the upper end surface of piezoelectric substrate 1 effectively, and the transducing efficiency from the electric signal $E_T$ to the surface acoustic wave increases.

Interdigital transducer $R_{Yi}$ is located so that the surface acoustic wave transmitting direction from interdigital transducer $T_Y$ and the surface acoustic wave receiving direction at interdigital transducer $R_{Yi}$ overlap each other, as shown in FIG. 12. Therefore, the surface acoustic wave, of the zeroth mode and the higher order modes, having the wavelength approximately equal to the interdigital periodicity p of interdigital transducer $R_{Yi}$, is transmitted through nonpiezoelectric plate 2 to an area, in contact with interdigital transducer $R_{Yi}$, of the upper end surface of piezoelectric substrate 1, and is transduced to each electric signal $E_{Ri}$ (i=1, 2, ......, 16) having a frequency approximately corresponding to the interdigital periodicity p of interdigital transducer $R_{Yi}$.

If the phase velocity of the zeroth mode surface acoustic wave is approximately equal to the phase velocity of the Rayleigh wave traveling on piezoelectric substrate 1 alone under the electrically shorted condition, and the phase velocity of the higher order mode surface acoustic wave is approximately equal to the phase velocity of the Rayleigh wave traveling on piezoelectric substrate 1 alone under the electrically opened condition, the transducing efficiency from the surface acoustic wave to the electric signal $E_{Ri}$ increases, and the electric signal $E_{Ri}$ is delivered at interdigital transducer $R_{Yi}$ with a quick response time.

If the thickness of piezoelectric substrate 1 is larger than three times the interdigital periodicity p of interdigital transducer $R_{Yi}$, and the thickness d of nonpiezoelectric plate 2 is smaller than interdigital periodicity p, the surface acoustic wave transmitted to nonpiezoelectric plate 2 is delivered as the electric signal $E_{Ri}$ at interdigital transducer $R_{Yi}$ effectively without a leakage of the surface acoustic wave on the inside of piezoelectric substrate 1. Accordingly, it is possible to operate the surface acoustic wave position-sensing device in FIG. 10 under low power consumption with low voltage, and to support the lower end surface of piezoelectric substrate 1 directly.

If using a material, as nonpiezoelectric plate 2, such that the phase velocity of the surface acoustic wave traveling on nonpiezoelectric plate 2 alone is lower than that traveling on piezoelectric substrate 1 alone, the surface acoustic wave transmitted to nonpiezoelectric plate 2 is delivered as the electric signal $E_{Ri}$ at interdigital transducer $R_{Yi}$ effectively without a leakage of the surface acoustic wave on the inside of piezoelectric substrate 1.

If using a piezoelectric ceramic having the polarization axis parallel to the thickness direction thereof, as piezoelectric substrate 1, the surface acoustic wave in nonpiezoelectric plate 2 is transmitted to the area, in contact with interdigital transducer $R_{Yi}$, of the upper end surface of piezoelectric substrate 1 effectively, and the transducing efficiency from the surface acoustic wave to the electric signal $E_{Ri}$ increases.

The electric signal $E_{Ri}$ is delivered at interdigital transducer $R_{Yi}$, and is transmitted to controlling system 7 via rectifier 5 and comparator 6. In this time, only the electric signal $E_{R1}$ at interdigital transducer $R_{Y1}$ is amplified via amplifier AMP, and then applied to interdigital transducers $T_X$ and $T_Y$. When an electric signal $E_T$ having a frequency approximately corresponding to the interdigital periodicity p of interdigital transducer $T_X$ is applied to interdigital transducer $T_X$, the electric signal $E_T$ is transduced to the surface acoustic wave at interdigital transducer $T_X$, and is transmitted from an area, in contact with interdigital transducer $T_X$, of the upper end surface of piezoelectric substrate 1 to nonpiezoelectric plate 2. The surface acoustic wave is transmitted through nonpiezoelectric plate 2 to an area, in contact with interdigital transducer $R_{Xi}$, of the upper end surface of piezoelectric substrate 1, and is transduced to each electric signal $E_{Ri}$ at interdigital transducer $R_{Xi}$. The electric signal $E_{Ri}$ is transmitted to controlling system 7 via rectifier 5 and comparator 6. Thus, interdigital transducers $T_Y$ and $R_{Yi}$ form 16 propagation lanes $U_{Yi}$ (i=1, 2, ......, 16) of the surface acoustic wave, and interdigital transducers $T_X$ and $R_{Xi}$ form 16 propagation lanes $U_{Xi}$ (i=1,2, ......, 16) of the surface acoustic wave. Interdigital transducer $T_Y$, a propagation lane $U_{Y1}$ of the surface acoustic wave between interdigital transducers $T_Y$ and $R_{Y1}$, interdigital transducer $R_{Y1}$, and amplifier AMP form an oscillator $H_1$. Oscillator $H_1$ enables the surface acoustic wave position-sensing device in FIG. 10 to have a small-sized circuit with a simple structure. The small-sized circuit causes the surface acoustic wave position-sensing device to have a small size which is very light in weight, and to be operated under low power consumption with low voltage.

Controlling system 7 in FIG. 10 plays four roles. The first role is to keep a check on a magnitude of the electric signal $E_{Ri}$. The second role is to sense a touch with a finger or others on the touch face by a decrease or a disappearance in magnitude of the electric signal $E_{Ri}$. The third role is to pick out one of interdigital transducers $R_{Xi}$, corresponding to the decrease or the disappearance in magnitude of the electric signal $E_{Ri}$, and one of interdigital transducers $R_{Yi}$ corresponding to the decrease or the disappearance in magnitude of the electric signal $E_{Ri}$. If touching a crossing point of propagation lanes $U_{Xi}$ and $U_{Yi}$ (without $U_{Y1}$) on the touch face with a pen, the surface acoustic wave is intercepted at the crossing point. Therefore, the magnitude of the electric signal $E_{Ri}$ at interdigital transducer $R_{Xi}$ and the magnitude of the electric signal $E_{Ri}$ at interdigital transducer $R_{Yi}$ decrease or disappear. Thus, it is possible to sense a touch with the pen on the touch face, moreover, to specify a touch-position corresponding to the crossing point with a high sensitivity and a quick response time. If touching, for example, a crossing point of propagation lanes $U_{X6}$ and $U_{Y2}$, a decrease or a disappearance in magnitude of the electric signal $E_{R6}$ at interdigital transducer $R_{X6}$ and a decrease or a disappearance in magnitude of the electric signal $E_{R2}$ at interdigital transducer $R_{Y2}$ happen. Thus, it is possible to specify a touch-position on the touch face by picking out one of interdigital transducers $R_{Xi}$ corresponding to a decrease or a disappearance in magnitude of the electric signal $E_{Ri}$, and one of interdigital transducers $R_{Yi}$ corresponding to a decrease or a disappearance in magnitude of the electric signal $E_{Ri}$.

In FIG. 12, two neighbors of propagation lanes $U_{Xi}$ are partially overlapping each other, and two neighbors of propagation lanes $U_{Yi}$ are also partially overlapping each other. If touching, for example, an overlapping area of propagation lanes $U_{X5}$ and $U_{X6}$ on the touch face, both the electric signal $E_{R5}$ at interdigital transducer $R_{X5}$ and the electric signal $E_{R6}$ at interdigital transducer $R_{X6}$ decrease. Thus, it is possible to specify a touch-position on an overlapping area of two propagation lanes $U_{Xi}$ on the touch face by picking out two neighboring interdigital transducers $R_{Xi}$ at which the electric signals $E_{Ri}$ decrease. In the same way, a touch-position on an overlapping area of two propagation lanes $U_{Yi}$ on the touch face is specified by picking out two neighboring interdigital transducers $R_{Yi}$ at which the electric signals $E_{Ri}$, decrease.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A surface acoustic wave position-sensing device comprising:

a piezoelectric substrate having an upper- and a lower end surfaces running perpendicular to the thickness direction thereof;

a nonpiezoelectric plate having an upper- and a lower end surfaces running perpendicular to the direction of the thickness d thereof;

at least two surface acoustic wave transducing units X and Y, each thereof consisting of N interdigital transducers $T_i$ (i=1, 2, ......, N) formed on said upper end surface of said piezoelectric substrate, the thickness of said piezoelectric substrate being larger than approximately three times an interdigital periodicity p of said interdigital transducer $T_i$, said thickness of d of said nonpiezoelectric plate being smaller than said interdigital periodicity p, an interdigital transducer R formed on said upper end surface of said piezoelectric substrate and having an interdigital periodicity equal to said interdigital periodicity p, said lower end surface of said nonpiezoelectric plate being mounted on said upper end surface of said piezoelectric substrate through said interdigital transducers $T_i$ and R, and N switches $W_i$ (i=1, 2, ......, N), output terminals thereof being connected with input terminals of said interdigital transducers $T_i$, respectively; and a controlling system connected with said surface acoustic wave transducing units X and Y, said interdigital transducer $T_i$ receiving an electric signal $E_T$ with a frequency approximately corresponding to said interdigital periodicity p, exciting a surface acoustic wave of the zeroth mode and the higher order modes on an area, in contact with said interdigital transducer $T_i$, of said upper end surface of said piezoelectric substrate, and transmitting said surface acoustic wave having the wavelength approximately equal to said interdigital periodicity p to an area, in contact with said interdigital transducer R, of said upper end surface of said piezoelectric substrate, through said nonpiezoelectric plate, the phase velocity of said surface acoustic wave of said zeroth mode being approximately equal to the phase velocity of the Rayleigh wave traveling on said piezoelectric substrate alone under the electrically shorted condition, the phase velocity of said surface acoustic wave of said higher order modes being approximately equal to the phase velocity of the Rayleigh wave traveling on said piezoelectric substrate alone under the electrically opened condition, said interdigital transducer R transducing said surface acoustic wave transmitted to said area, in contact with said interdigital transducer R, of said upper end surface of said piezoelectric substrate, to an electric signal $E_R$ with a frequency approximately corresponding to said interdigital periodicity p, said nonpiezoelectric plate being made of a material such that the phase velocity of the surface acoustic wave traveling on said nonpiezoelectric plate alone is lower than that traveling on said piezoelectric substrate alone, said controlling system turning on and off said switches $W_i$ with a fixed period in turn, keeping a check on a magnitude of said electric signal $E_R$, sensing a touch with a finger or others on said upper end surface of said nonpiezoelectric plate by a decrease or a disappearance in magnitude of said electric signal $E_R$, picking out one of said switches $W_i$ turned on when said decrease or said disappearance in magnitude of said electric signal $E_R$ happens, said surface acoustic wave transducing unit X having N propagation lanes $U_{Xi}$ (i=1, 2, ......, N) of said surface acoustic wave between said interdigital transducers $T_i$ and R, two neighbors of said propagation lanes $U_{Xi}$ being closed or partially overlapping each other, said surface acoustic wave transducing unit Y having N propagation lanes $U_{Yi}$ (i=1, 2, ......, N) of said surface acoustic wave between said interdigital transducers $T_i$ and R, two neighbors of said propagation lanes $U_{Yi}$ being closed or partially overlapping each other, said propagation lane $U_X$ being vertical to said propagation lane $U_Y$.

2. A surface acoustic wave position-sensing device as defined in claim 1 further comprising:

an amplifier $A_X$, an input terminal of said switch $W_i$ in said surface acoustic wave transducing unit Y being connected with an output terminal of said interdigital transducer R in said surface acoustic wave transducing unit X via said amplifier $A_X$; and an amplifier $A_Y$, an input terminal of said switch $W_i$ in said surface acoustic wave transducing unit X being connected with an output terminal of said interdigital transducer R in said surface acoustic wave transducing unit Y via said amplifier $A_Y$, said switches $W_i$ in said surface acoustic wave transducing unit X, said propagation lanes $U_{Xi}$ as delay elements, said amplifier $A_X$, said switches $W_i$ in said surface acoustic wave transducing unit Y, said propagation lanes $U_{Yi}$ as delay elements, and said amplifier $A_Y$ forming N oscillators $H_i$, (i=1, 2, ......, N).

3. A surface acoustic wave position-sensing device as defined in claim 1 further comprising a supporting board cemented to said lower end surface of said piezoelectric substrate.

4. A surface acoustic wave position-sensing device as defined in claim 1, wherein said piezoelectric substrate is made of a piezoelectric ceramic, the polarization axis thereof being parallel to the thickness direction thereof.

5. A surface acoustic wave position-sensing device comprising:

- a piezoelectric substrate having an upper- and a lower end surfaces running perpendicular to the thickness direction thereof;
- a nonpiezoelectric plate having an upper- and a lower end surfaces running perpendicular to the direction of the thickness d thereof;
- at least two surface acoustic wave transducing units X and Y, each thereof consisting of
  - an interdigital transducer T formed on said upper end surface of said piezoelectric substrate, the thickness of said piezoelectric substrate being larger than approximately three times an interdigital periodicity p of said interdigital transducer T, said thickness d of said nonpiezoelectric plate being smaller than said interdigital periodicity p, and
- N interdigital transducers $R_i$ (i=1, 2, ......, N) formed on said upper end surface of said piezoelectric substrate and having an interdigital periodicity equal to said interdigital periodicity p, said lower end surface of said nonpiezoelectric plate being mounted on said upper end surface of said piezoelectric substrate through said interdigital transducers T and $R_i$; and
- a controlling system connected with said two surface acoustic wave transducing units X and Y,
  - said interdigital transducer T receiving an electric signal $E_T$ with a frequency approximately corresponding to said interdigital periodicity p, exciting a surface acoustic wave of the zeroth mode and the higher order modes on an area, in contact with said interdigital transducer T, of said upper end surface of said piezoelectric substrate, and transmitting said surface acoustic wave having the wavelength approximately equal to said interdigital periodicity p to an area, in contact with said interdigital transducers $R_i$, of said upper end surface of said piezoelectric substrate, through said nonpiezoelectric plate, the phase velocity of said surface acoustic wave of said zeroth mode being approximately equal to the phase velocity of the Rayleigh wave traveling on said piezoelectric substrate alone under the electrically shorted condition, the phase velocity of said surface acoustic wave of said higher order modes being approximately equal to the phase velocity of the Rayleigh wave traveling on said piezoelectric substrate alone under the electrically opened condition,
  - said interdigital transducers $R_i$ transducing said surface acoustic wave transmitted to said area, in contact with said interdigital transducers $R_i$, of said upper end surface of said piezoelectric substrate, to electric signals $E_{Ri}$ (i=1, 2, ......, N), said electric signal $E_{Ri}$, having a frequency approximately corresponding to said interdigital periodicity p,
  - said nonpiezoelectric plate being made of a material such that the phase velocity of the surface acoustic wave traveling on said nonpiezoelectric plate alone is lower than that traveling on said piezoelectric substrate alone,
  - said controlling system keeping a check on a magnitude of said electric signals $E_{Ri}$, sensing a touch with a finger or others on said upper end surface of said nonpiezoelectric plate by a decrease or a disappearance in magnitude of said electric signals $E_{Ri}$, picking out at least one of said interdigital transducers $R_i$ corresponding to said decrease or said disappearance in magnitude of said electric signals $E_{Ri}$,
  - said surface acoustic wave transducing unit X having N propagation lanes $U_{Xi}$ (i=1, 2, ......, N) of said surface acoustic wave between said interdigital transducers T and $R_i$, two neighbors of said propagation lanes $U_{Xi}$ being closed or partially overlapping each other,
  - said surface acoustic wave transducing unit Y having N propagation lanes $U_{Yi}$ (i=1, 2, ......, N) of said surface acoustic wave between said interdigital transducers T and $R_i$, two neighbors of said propagation lanes $U_{Yi}$ being closed or partially overlapping each other, said propagation lane $U_{Xi}$ being vertical to said propagation lane $U_{Yi}$.

6. A surface acoustic wave position-sensing device as defined in claim 5 further comprising an amplifier AMP, an output terminal of the interdigital transducer $R_1$ of said interdigital transducers $R_i$ in said surface acoustic wave transducing unit Y being connected with an input terminal of said interdigital transducer T in said surface acoustic wave transducing units X and Y, respectively, said interdigital transducer T in said surface acoustic wave transducing unit Y, the propagation lane $U_{Y1}$ as a delay element, said interdigital transducer $R_{R1}$ in said surface acoustic wave transducing unit Y, and said amplifier AMP forming an oscillator $H_1$.

7. A surface acoustic wave position-sensing device as defined in claim 5 further comprising a supporting board cemented to said lower end surface of said piezoelectric substrate.

8. A surface acoustic wave position-sensing device as defined in claim 5, wherein said piezoelectric substrate is made of a piezoelectric ceramic, the polarization axis thereof being parallel to the thickness direction thereof.

* * * * *